United States Patent [19] [11] 4,229,186
Wilson [45] Oct. 21, 1980

[54] ABRASIVE BODIES

[76] Inventor: William I. Wilson, 18 East St., East Town, Johannesburg, Transvaal, South Africa

[21] Appl. No.: 882,808

[22] Filed: Feb. 28, 1978

[30] Foreign Application Priority Data

Mar. 3, 1977 [ZA] South Africa ............... 77/1270

[51] Int. Cl.² ............................................. B24D 3/06
[52] U.S. Cl. ........................................ 51/297; 51/307; 51/309
[58] Field of Search ............... 51/295, 307, 308, 309, 51/297, 293

[56] References Cited

U.S. PATENT DOCUMENTS

| 3,141,746 | 7/1964 | Delai | 51/309 |
| 3,212,852 | 10/1965 | Bundy | 51/309 |
| 3,407,445 | 10/1968 | Strong | 51/307 |
| 3,767,371 | 10/1973 | Wentorf et al. | 51/309 |
| 3,850,591 | 11/1974 | Wentorf, Jr. | 51/309 |
| 4,063,909 | 12/1977 | Mitchell | 51/309 |

Primary Examiner—Donald J. Arnold
Attorney, Agent, or Firm—Haseltine, Lake & Waters

[57] ABSTRACT

A laminated abrasive body which is in effect a thick compact comprising a plurality of diamond or cubic boron nitride compacts laminated together, joining of adjacent compacts taking place by means of a layer of a metal or metal alloy braze and the thickness of the laminate exceeding 5 mm and the longest dimension of the body transverse to the thickness exceeding 2 mm. The invention also covers methods of making such laminated bodies by forming alternate layers of braze and compact or compact-forming material and then forming the laminate under elevated temperature and pressure.

21 Claims, 2 Drawing Figures

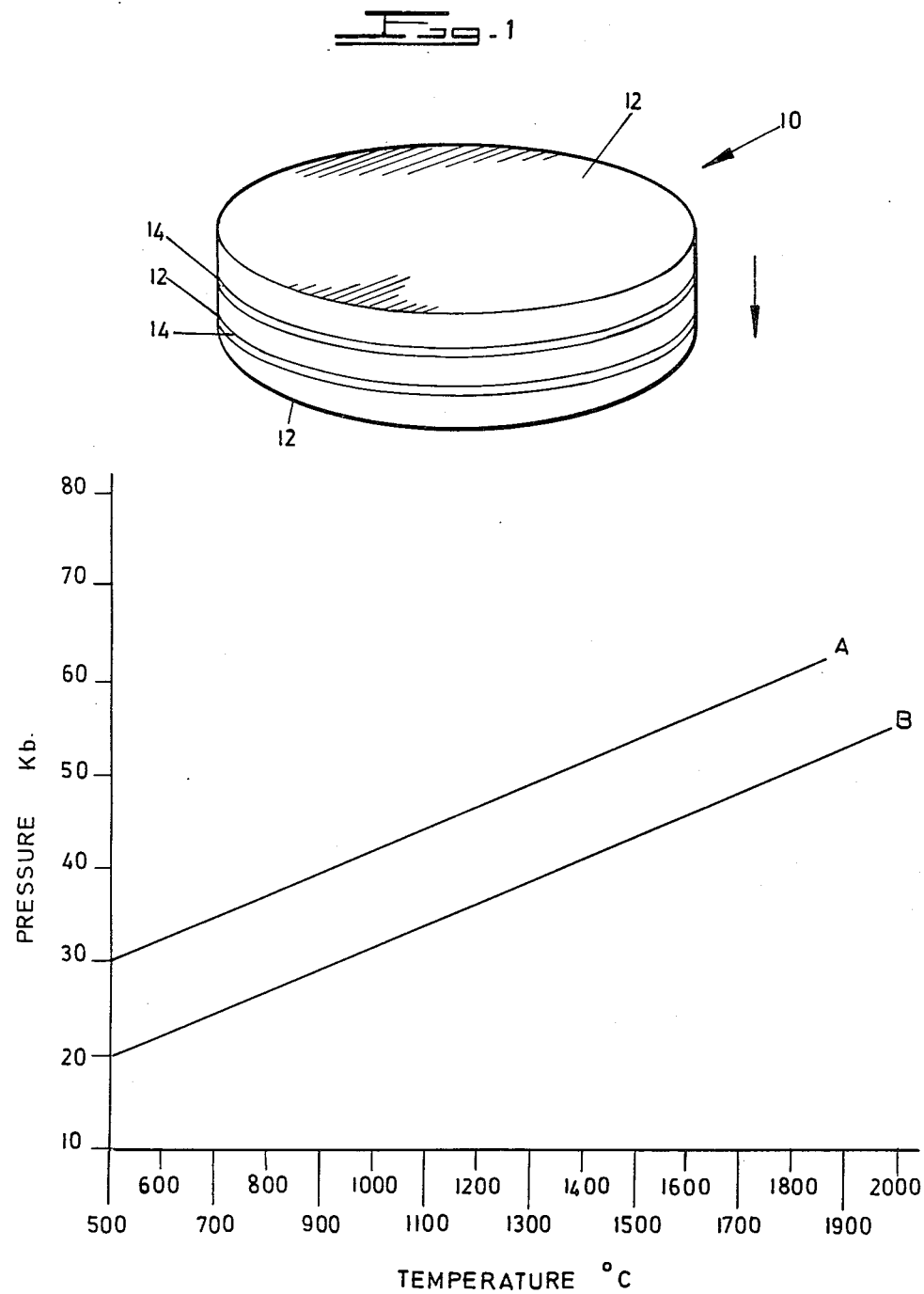

ABRASIVE BODIES

This invention relates to abrasive bodies, and more particularly to abrasive bodies which contain abrasive compacts.

Abrasive compacts are well known in the art and consist essentially of a mass of abrasive particles, generally present in an amount of at least 70%, preferably 80 to 90% by volume of the compact, bonded into a hard conglomerate. Compacts are polycrystalline masses and can replace single large crystals. The abrasive particles of compacts are invariably super-hard abrasives such as diamond and cubic boron nitride.

Abrasive compacts, particularly diamond and cubic boron nitride compacts, may be self bonded, i.e. the individual particles of the compact may be fused and bonded together without the aid of a metal or like bonding matrix. Alternatively, stronger and more durable compacts are produced when there is a suitable bonding matrix present.

In the case of cubic boron nitride compacts, i.e. compacts in which the abrasive particle is predominantly cubic boron nitride, the bonding matrix, when provided, preferably contains a catalyst (also known as a solvent) for cubic boron nitride growth such as aluminum or an alloy of aluminum with nickel, cobalt, iron, manganese or chromium. Such catalysts tend to be soft and to minimize smearing of the catalyst during use of the compact it is preferred that the matrix also include a ceramic such as silicon nitride which is capable of reacting with the catalyst to produce a hard material.

In the case of diamond compacts, i.e. compacts in which the abrasive particle is predominantly diamond, the bonding matrix, when provided, preferably contains a solvent for diamond growth. Suitable solvents are metals of Group VIII of the Periodic Table such as cobalt, nickel or iron or an alloy containing such a metal.

For diamond and cubic boron nitride compacts the presence of a solvent or catalyst for the particular abrasive being used in the compact is desirable because then under the conditions necessary for the manufacture of such compacts intergrowth between the particles occurs. As is known in the art, diamond and cubic boron nitride compacts are generally manufactured under conditions of temperature and pressure at which the abrasive particle is crystallographically stable.

Diamond and cubic boron nitride compacts are used for the machining of metals. In use, the compacts are bonded to a suitable support such as a shank to form a tool. The compacts may be bonded to a backing such as a cemented carbide backing and then the backing bonded to the support to form the tool. Diamond and cubic boron nitride compacts bonded to a cemented tungsten carbide backing are described and illustrated in U.S. Pat. Nos. 3,743,489 and 3,745,623 and British Pat. No. 1,489,130.

This invention is concerned only with diamond and cubic boron nitride compacts.

According to the present invention there is provided a laminated abrasive body comprising a plurality of abrasive compacts or joined together;

each compact comprising a mass of diamond or cubic boron nitride abrasive particles or a mixture thereof, present in an amount of at least 70 percent by volume of the compact, bonded into a hard conglomerate;

adjacent compacts being joined by means of a layer of a metal or metal alloy braze;

the thickness of the laminate exceeding 5 mm and the longest dimension of the body transverse to the thickness exceeding 2 mm.

The invention provides a laminated abrasive body which acts, in effect, as a thick compact. A laminated abrasive body may be used as a high pressure piston in apparatus for obtaining ultra-high pressures of the order of megabars. The abrasive body will generally contain only diamond or only cubic boron nitride compacts.

Each compact in the laminated abrasive body will usually be a thin body presenting major surfaces, i.e., those of largest area, on each of opposite sides thereof, bonding between adjacent compacts taking place between major surfaces thereof. The major surfaces of the compacts may be rectangular or circular. Circular compacts are preferred because this is the form in which they are usually produced. The thickness of each compact is typically in the range 0.1 to 2.5 mm.

The laminated abrasive body, while being capable of having a substantial thickness, will usually not exceed 25 mm in this direction. The longest dimension of the body transverse to the thickness may for example be in the range 5 to 25 mm.

The braze layers between adjacent compacts are preferably thin and do not exceed 0.5 mm in thickness. Preferably, each braze layer has a thickness in the range 50 to 500 microns.

The metal or metal alloy braze layers may be either low temperature brazes or high temperature brazes. Low temperatures brazes are those metals or alloys which melt below 700° C. High temperature brazes usually have a melting point exceeding 1000° C.

A wide variety of brazes well known in the art may be used. It be preferred that the braze is one which is capable of alloying with the matrix of the compact, when such is provided and preferably also capable of wetting the abrasive particles of the compacts. Examples of suitable brazes can be found in "Metals Handbook", American Society for Metals, 8th Edition, Vol 6, 1974. Examples of suitable high temperature brazes are described in British Pat. No. 1,489,130. For laminating diamond compacts together, the preferred high temperature braze is zirconium. For laminating cubic boron nitride compacts together the preferred high temperature braze is a copper/tin/titanium alloy or a copper/titanium alloy.

The diamond and cubic boron nitride compacts for the laminated abrasive body of the invention may be any known in the art. Examples of suitable compacts are those illustrated and described in the above mentioned British patent save, of course, that no backing is provided. It is preferred that the compacts contain a certain amount of intergrowth between the particles. This is achieved by providing a matrix which contains a solvent (catalyst) for the abrasive particle of the compacts. Suitable solvents for diamond and cubic boron nitride are well known in the art, as is discussed above.

The invention includes within its scope methods for producing the laminated abrasive body described above. The first method involves laminating preformed compacts together and includes the steps of forming alternate layers of compact and braze layer, in powder or foil form, and heat treating to laminated adjacent compacts together, the heat treatment taking place under conditions which inhibit deterioration of the abrasive particles of the compacts.

Deterioration of diamond results in graphite formation and deterioration of cubic boron nitride results in hexagonal boron nitride being formed. The conditions of heat treatment must be such as to inhibit such deterioration. To achieve this the heat treatment may take place under elevated conditions of temperature and pressure at which the abrasive particles of the compact are crystallographically stable. (FIG. 2 discussed hereinafter). The choice of metal or metal alloy for the braze layer will depend on the conditions being used. At higher temperatures, higher melting alloys will be most effective and vice versa.

Deterioration of the abrasive particles in the compacts may also be avoided by carrying out the heat treatment at an appropriate temperature in a vacuum of $10^{-4}$ Torr or better or in the presence of an inert gas such as argon or neon. In the case of diamond compacts, the heat treatment should not exceed 800° C. under these conditions and in the case of cubic boron nitride compacts the heat treatment should not exceed 1000° C. under these conditions. Choice of metal or metal alloy braze for most effective laminating will again be dictated by the temperature at which the heat treatment takes place.

The weight of a compact generally provides sufficient pressure to ensure intimate contact between compact and braze layer and achieve effective laminating by heat treatment. A load may be placed on the alternate layers to improve the intimate contact between compact and braze layer.

The metal or metal alloy braze used to form the laminate may be provided in the form of a powder or a foil. The powder is usually a fine powder, i.e. having an average particle size of less than 50 microns.

A second method of producing the laminated abrasive body of the invention is to produce the compacts while simultaneously producing the laminated body. This method includes the steps of forming an alternate layers of compact-forming material and metal or metal alloy braze having a melting point above 1450° C. in powder or foil form, subjecting the layers to elevated conditions of temperature and pressure suitable to form a compact of the compact-forming material, reducing the temperature, releasing the pressure and recovering the abrasive body. This method must be carried out in a suitable high temperature/high pressure apparatus known in the art. A suitable apparatus is that of the so-called "belt" type illustrated in U.S. Pat. No. 2,941,248. The layers used to form the laminate are placed in a reaction capsule which is then inserted in the reaction zone of the high temperature/high pressure apparatus. The pressure is first raised to the desired value and then the temperature is raised. These elevated conditions of temperature and pressure are generally maintained for a period of about 10 to 60 minutes.

The temperature is then first reduced, generally to substantially ambient conditions, to prevent deterioration of the abrasive particles in the formed body, the pressure released and the laminated abrasive body recovered from the capsule using conventional techniques.

The compact-forming material may consist substantially only of abrasive particles in which case an abrasive body will be produced in which the individual compacts are of the self-bonded type. It is preferred, however, that the compact have a matrix, particularly a matrix which contains a solvent for the abrasive particles. In this case, the compact forming material may comprise a mixture of abrasive particles and matrix in powder form. Alternatively, the compact-forming material may comprise a mass of abrasive particles in contact with a layer, in powder or foil form, of the matrix which in this case must be capable of infiltrating into the mass of particles under the conditions of elevated temperature and pressure which are used to form the body. Examples of matrices which are capable of infiltrating a mass of diamond or cubic boron nitride particles are described in U.S. Pat. Nos. 3,743,489 and 3,745,623.

Both the abrasive particles and the matrix in powder form are generally used as fine powders, i.e. powders having an average particle size of less than 50 microns, typically having an average particle size in the range 10 to 40 microns.

The metal or metal alloy for the braze layer should, in this embodiment, exceed 1450° C. because of the onerous conditions necessary for compact manufacture. These conditions are typically a temperature in the range 1500° C. to 2000° C. and a pressure in the range 55 kilobars to 85 kilobars.

The invention is described further with reference to the accompanying drawings in which:

FIG. 1 is a perspective view of a laminated abrasive body of the invention, and

FIG. 2 is a temperature/pressure phase diagram for carbon and boron nitride.

Referring to FIG. 1, there is shown a laminated abrasive body 10 consisting of three abrasive compacts, each designated by the number 12, joined together by means of braze layers 14. Each compact has a thickness of 2 mm and a diameter of 6 mm. The thickness of the laminated body, i.e. in the direction of the arrow, is 6.25 mm.

FIG. 2 illustrates the temperature/pressure phase diagram for carbon and boron nitride. Line A is the carbon equilibrium line and line B is the boron nitride equilibrium line. Carbon is stable in its cubic form, i.e. diamond form, above the line A and stable in its graphite form below the line A. Boron nitride is stable in its cubic form above the line B and stable in its hexagonal form below the line B.

The invention is further illustrated by the following non-limiting examples.

EXAMPLE 1

A laminated abrasive body consisting of a plurality of diamond compacts laminated together was produced in the following manner. Alternating layers of a diamond/cobalt powder mixture and zirconium foils were placed in the reaction capsule of a conventional high temperature/high pressure apparatus. The diamond/cobalt mixture contained 80 percent by volume diamond particles and 20 percent by volume cobalt powder and had an average particle size of about 40 microns. The mixture layers had a depth or thickness of about 2 to 3 mm and the zirconium foils were each of the order of 100 microns in thickness. The reaction capsule was placed in the reaction zone of the high temperature/high pressure apparatus and its contents were exposed to a temperature of the order of 1600° C. and a pressure of the order of 55 to 60 kilobars. These conditions were maintained for about 10 minutes. The temperature was allowed to return to substantially ambient conditions and the pressure was released. Recovered from the capsule was a laminated abrasive body consisting of a plurality of disc-shaped diamond compacts laminated to each other through zirconium layers.

The body in the direction of lamination had a thickness of about 15 mm and a diameter of 5 mm.

EXAMPLE 2

A laminated abrasive body consisting of a plurality of cubic boron nitride compacts laminated together was produced in the following manner.

Six disc-shaped cubic boron nitride compacts, each having a thickness of about 2 mm and a diameter of 4 mm were produced using known techniques. Each compact had a bonding matrix containing silicon nitride and aluminum and consisted of 85 percent by volume cubic boron nitride, the balance being the matrix.

A composite was formed of alternating layers of cubic boron nitride compacts and powdered copper/tin/titanium alloys. Each layer of powdered alloy had a thickness of about 100 microns. The composite was placed in a vacuum of $10^{-4}$ Torr and exposed to a temperature of 750° C. for a period of 15 minutes. Recovered from the vacuum was a laminated abrasive body consisting of a plurality of cubic boron nitride compacts laminated together and having a dimension in the direction of lamination, i.e. thickness of 12 mm.

I claim:

1. A laminated abrasive body comprising a plurality of abrasive compacts joined together to form a laminate; each compact comprising a mass of diamond or cubic boron nitride abrasive particles or a mixture thereof, present in an amount of at least 70 percent by volume of the compact, bonded into a hard conglomerate; the adjacent compacts being joined by means of a layer of a metal or metal alloy braze; the thickness of the laminate exceeding 5 mm and the longest dimension of the body transverse to the thickness exceeding 2 mm.

2. An abrasive body according to claim 1 wherein each compact is a thin body presenting major surfaces on each of opposite sides thereof, adjacent compacts being joined between major surfaces thereof.

3. An abrasive body according to claim 2 wherein the major surfaces of the compacts are rectangular.

4. An abrasive body according to claim 2 wherein the major surfaces of the compacts are circular.

5. An abrasive body according to claim 1 in which the thickness does not exceed 25 mm.

6. An abrasive body according to claim 2 in which the thickness does not exceed 25 mm.

7. An abrasive body according to claim 1 wherein the longest dimension of the body transverse to the thickness is in the range 5 to 25 mm.

8. An abrasive body according to claim 5 wherein the longest dimension of the body transverse to the thickness is in the range 5 to 25 mm.

9. An abrasive body according to claim 1 wherein each braze layer does not exceed 0.5 mm in thickness.

10. An abrasive body according to claim 9 wherein each braze layer has a thickness in the range 50 to 500 microns.

11. An abrasive body according to claim 1 wherein the compacts are diamond compacts and the braze layers are zirconium braze layers.

12. An abrasive body according to claim 1 wherein the compacts are cubic boron nitride compacts and the braze layers are selected from copper/titanium and copper/tin/titanium alloy layers.

13. A method of producing a laminated abrasive body comprising a plurality of abrasive compacts joined together to form a laminate, each compact comprising a mass of diamond or cubic boron nitride abrasive particles or a mixture thereof, present in an amount of at least 70 percent by volume of the compact, bonded into a hard conglomerate, said method including the steps of forming alternate layers of compact and a metal or metal alloy braze, in powder or foil form, and heat treating said layers to cause adjacent compacts to join together, the heat treatment taking place under elevated conditions of temperature and pressure at which the abrasive particles of the compacts are crystallographically stable.

14. A method according to claim 13 wherein the compacts are diamond compacts and the heat treatment takes place at a temperature not exceeding 800° C. in a vacuum of at least $10^{-4}$ Torr or in the presence of an inert gas.

15. A method according to claim 13 wherein the compacts are cubic boron nitride compacts and the heat treatment takes place at a temperature not exceeding 1000° C. in a vacuum of at least $10^{-4}$ Torr or in the presence of an inert gas.

16. A method of producing a laminated abrasive body comprising a plurality of abrasive compacts joined together to form a laminate, each compact comprising a mass of diamond or cubic boron nitride abrasive particles or a mixture thereof, present in an amount of at least 70 percent by volume of the compact, bonded into a hard conglomerate, said method including the steps of forming alternate layers of diamond or cubic boron nitride compact-forming material and a metal or metal alloy braze of melting point exceeding 1450° C., in powder or foil form, subjecting said layers to elevated conditions of temperature and pressure suitable to form a compact of the compact-forming material, reducing the temperature, releasing the pressure and recovering the abrasive body.

17. A method according to claim 16 wherein the compact-forming material comprises a mixture of the abrasive particles and a matrix in powder form.

18. A method according to claim 16 wherein the compact forming material comprises a mass of the abrasive particles in contact with a layer, in powder or foil form, of a matrix which is capable of infiltrating into the mass of particles under the conditions of elevated temperature and pressure used to produce the body.

19. A method according to claim 17 wherein the matrix contains a solvent for the abrasive particles in the compact-forming material.

20. A method according to claim 18 wherein the matrix contains a solvent for the abrasive particles in the compact-forming material.

21. A method according to claim 16 wherein the elevated temperature is in the range 1500° C. to 2000° and the elevated pressure is in the range 55 kilobars to 85 kilobars.

* * * * *